US008661234B2

(12) United States Patent
Lange et al.

(10) Patent No.: US 8,661,234 B2
(45) Date of Patent: Feb. 25, 2014

(54) INDIVIDUALIZED PER DEVICE INITIALIZATION OF COMPUTING DEVICES IN AVOIDANCE OF MASS EXPLOITATION OF VULNERABILITIES

(75) Inventors: Sebastian Lange, Seattle, WA (US); Adam Gabriel Poulos, Bothell, WA (US); Victor Tan, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1254 days.

(21) Appl. No.: 12/023,828

(22) Filed: Jan. 31, 2008

(65) Prior Publication Data

US 2009/0199018 A1 Aug. 6, 2009

(51) Int. Cl.
*G06F 9/00* (2006.01)

(52) U.S. Cl.
USPC .............................................. 713/2

(58) Field of Classification Search
USPC .............................................. 713/2
See application file for complete search history.

(56) References Cited

U.S. PATENT DOCUMENTS

| 5,768,598 | A * | 6/1998 | Marisetty et al. | 710/260 |
| 5,937,063 | A | 8/1999 | Davis | |
| 6,141,756 | A * | 10/2000 | Bright et al. | 726/22 |
| 6,189,100 | B1 * | 2/2001 | Barr et al. | 713/182 |
| 7,000,249 | B2 | 2/2006 | Lee | |
| 7,117,376 | B2 | 10/2006 | Grawrock | |
| 7,174,457 | B1 | 2/2007 | England et al. | |
| 7,216,369 | B2 | 5/2007 | Wiseman et al. | |
| 7,237,121 | B2 | 6/2007 | Cammack et al. | |
| 8,156,331 | B2 * | 4/2012 | Kawano et al. | 713/168 |
| 2003/0187619 | A1 * | 10/2003 | Lee et al. | 702/188 |
| 2003/0200454 | A1 * | 10/2003 | Foster et al. | 713/200 |
| 2003/0210521 | A1 * | 11/2003 | Rietze et al. | 361/685 |
| 2004/0153640 | A1 * | 8/2004 | Sugita et al. | 713/2 |
| 2005/0028154 | A1 * | 2/2005 | Smith et al. | 717/176 |
| 2005/0071677 | A1 * | 3/2005 | Khanna et al. | 713/201 |
| 2005/0257041 | A1 * | 11/2005 | Wallenstein et al. | 713/2 |
| 2006/0026417 | A1 | 2/2006 | Furusawa et al. | |
| 2006/0107030 | A1 * | 5/2006 | Biondi et al. | 713/2 |
| 2006/0179302 | A1 | 8/2006 | Hatakeyama | |
| 2007/0130452 | A1 | 6/2007 | Muir | |
| 2007/0162734 | A1 * | 7/2007 | Noguchi | 713/1 |
| 2008/0082680 | A1 * | 4/2008 | Grewal et al. | 709/232 |
| 2009/0307474 | A1 * | 12/2009 | Johnston | 713/2 |

OTHER PUBLICATIONS

Arbaugh et al., "A Secure and Reliable Bootstrap Architecture", Proceedings of the 1997 IEEE Symposium on Security and Privacy, Oakland, CA, USA, May 4-7, 1997, 65-71.

(Continued)

*Primary Examiner* — Teshome Hailu

(74) *Attorney, Agent, or Firm* — Judy Yee; Micky Minhas

(57) ABSTRACT

An individualized per device initialization of a computing device is unique relative to the initialization of other computing devices. A common initialization program, common to all computing devices of a particular type such as a game console, may be modified to be unique for each computing device. Modification may comprise the application of at least one individualized per device secret, e.g., key, to at least a portion of the common initialization program such as at least one initialization stage. Initialization is tied to one or more device specific identities. In this way, initialization vulnerabilities discovered on a particular device cannot be exploited en masse on other computing devices because each initialization program stored in each computing device is unique. The device specific nature of the initialization program may be extended to other information input to the computing device in order to prevent unauthorized sharing of information with other computing devices.

12 Claims, 4 Drawing Sheets

(56) References Cited

OTHER PUBLICATIONS

Dyer et al., "Personal Firewalls and Intrusion Detection Systems", IBM T. J. Watson Research Center, 2001, 14 Pages.

Liu et al., "Investigation on Vulnerabilities of Pre-boot and Post-boot Authentication", Defence R & D Canada-Ottawa, Contract Report, Mar. 2006, 112 pages.

* cited by examiner

INDIVIDUALIZED PER DEVICE INITIALIZATION OF COMPUTING DEVICES IN AVOIDANCE OF MASS EXPLOITATION OF VULNERABILITIES

TECHNICAL FIELD

The technical field relates generally to computing and, more specifically, to protecting the initialization of computing devices from unauthorized manipulation.

BACKGROUND

All computing devices, including but not limited to computers, game consoles, cellular telephones and personal digital assistants, have an initialization or startup phase generally referred to as the boot stage, during which time they bootstrap themselves to their full set of functionalities. During the boot stage, special boot code is executed that sets up system parameters and core system behavior, which may include setting up a security system or a digital rights management system. The boot stage is one of the most vulnerable for computing devices. One of the most severe security attacks occurs when a hacker is able to access and manipulate the boot code of a computing device. The ability to manipulate the boot code may allow a hacker to take over the computing device and subvert the security system that would normally be put in place during unmolested initialization. Making matters worse, a successful hacker attack may be shared with other hackers and even simplified for use by non-technical people on similar computing devices. Thus, hackers could generate attacks that the general public can use.

The mass market consequences for manufacturers and retailers of computing devices and services to and through them can quickly become very serious when a single successful hacker attack can spread by distribution to similarly vulnerable computing devices. For example, a hacker finds a flaw in a satellite set top box allowing manipulation of its boot code and, thereafter, removal of the channel locks and pay-per-view restrictions. This successful hack may be spread by the creation of a tool and/or a mod chip enabling others to take advantage of the same flaw in many other satellite set top boxes. Losses to the manufacturer of the set top box and service providers could be magnified greatly with a distributable attack. There may be additional liabilities as well due to hackers that may not be aware of all system requirements pertaining to safety. Altering code may lead to safety hazards such as overheated components that do not receive required cooling by modified code. This may lead to product liability claims. Thus, whether it be losses from mass theft of services, unauthorized sharing that does not respect intellectual property rights and licenses, or product liability issues, there are many important reasons to secure computing devices from unauthorized manipulation.

SUMMARY

This Summary is provided to introduce a selection of concepts in a simplified form that are further described below in the Detailed Description Of Illustrative Embodiments. This Summary is not intended to identify key features or essential features of the claimed subject matter, nor is it intended to be used to limit the scope of the claimed subject matter.

The present invention provides for individualized per device initialization of computing devices. An individualized per device initialization program is unique relative to initialization programs in other computing devices. A common initialization program, common to all computing devices of a particular type such as a game console, may be modified to be unique for each computing device. Modification may be of the image of the secured or unsecured initialization program stored in memory or in programming data and/or instructions within the initialization program. Modification may comprise the application of at least one individualized per device secret such as a secret or public key to at least a portion of the common initialization program such as a particular initialization stage. As such, a common initialization program may be rendered unique to a particular computing device through, for example, encryption of the common initialization program by a key unique to the particular computing device. Per device secrets may also be used to authenticate signatures and verify contents of per device initialization program as a further measure to secure against unauthorized manipulation. Initialization is tied to one or more device specific identities. In this way, initialization vulnerabilities discovered on a particular device cannot be exploited en masse on other computing devices because each initialization program or its image in memory is unique to each device. Further, transfer of a device individualized image to another device using a different set of per device secrets could be detectable and preventable. Individualized per device initialization programs may only be accessed by one device by, for example, decrypting or otherwise unlocking the individualized per device initialization program with one or more per device secret that may be accompanied by other common or unique security measures. The device specific nature of the initialization program may be extended to other information on a computing device, such as all information input to the computing device in order to prevent unauthorized sharing of information with other computing devices.

An advantage of having a per device initialization program per computing device is that a vulnerability in one device cannot be exploited en masse on other computing devices by reusing the same modified initialization program. For example, if a hacker finds a software vulnerability in an initialization stage on one computing device and attempts to exploit it or distribute it with a mod chip or otherwise, the hacker's exploitation of the vulnerability is limited to the one computing device. Since a hacker doesn't know all the per device secrets of all devices he cannot prepare a modified initialization stage or program that would run on all devices.

Another advantage of having a per device initialization program per computing device is that it makes reverse engineering by comparison more difficult because among two computing devices there are at least two per device secrets, likely among many other security measures.

Individualized initialization of computing devices has broad applicability to any system that could benefit from protecting information or services against misuse. Individualized initialization of computing devices not only makes it more difficult to attack systems employing it, but also prevents mass exploitation of successful attacks, which eliminates much of the incentive to attack computing devices in the first place. This damage control security measure could save manufacturers and service providers from costly recalls and lost business due to application, service or media piracy.

BRIEF DESCRIPTION OF THE DRAWINGS

The foregoing summary, as well as the following detailed description, is better understood when read in conjunction with the appended drawings. For the purpose of illustrating individualized initialization of computing devices, there is shown in the drawings exemplary constructions thereof; however, individualized initialization of computing devices is not limited to the specific methods and instrumentalities disclosed.

DETAILED DESCRIPTION OF ILLUSTRATIVE EMBODIMENTS

Figure 1:
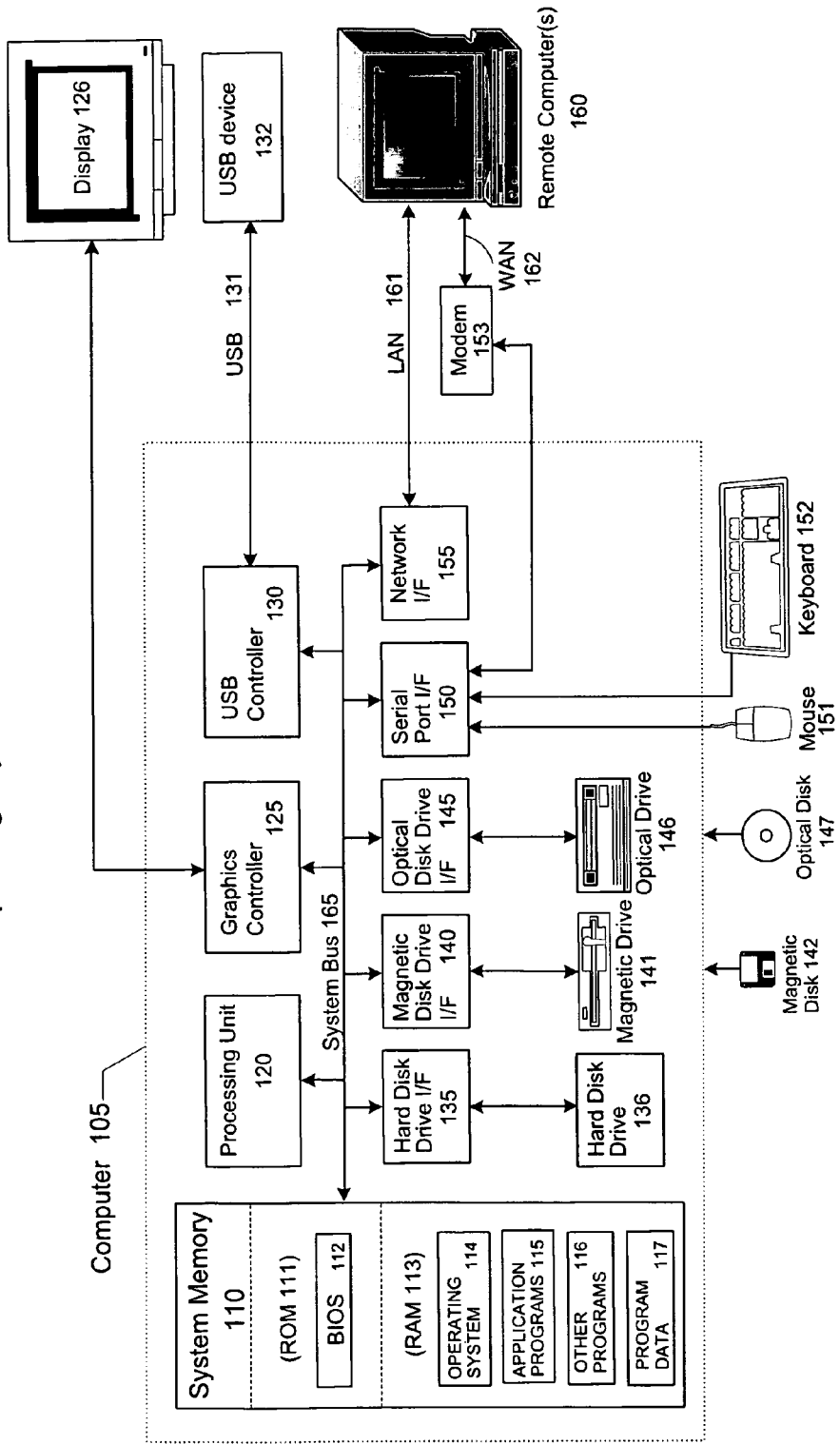
FIG. 1 is a block diagram of an exemplary open computing environment in which various aspects of individualized initialization of computing devices can be implemented.

Reference will now be made in detail to embodiments of the present technology for individualized initialization of computing devices, examples of which are illustrated in the accompanying drawings. While the technology for individualized initialization of computing devices will be described in conjunction with various embodiments, it will be understood that they are not intended to limit the present technology for individualized initialization of computing devices to these embodiments. On the contrary, the presented technology for individualized initialization of computing devices is intended to cover alternatives, modifications, and equivalents, which may be included within the spirit and scope the various embodiments as defined by the appended claims. Furthermore, in the following detailed description, numerous specific details are set forth in order to provide a thorough understanding of the present technology for individualized initialization of computing devices. However, the present technology for individualized initialization of computing devices may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present detailed description, discussions utilizing terms such as "opening", "determining", "sequencing", "reading", "loading", "overriding", "writing", "creating", "including", "comparing", "receiving", "providing", "generating", "associating", and "arranging", or the like, refer to the actions and processes of a computer system or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present technology for individualized initialization of computing devices is also well suited to the use of other computer systems such as, for example, optical and mechanical computers. Additionally, it should be understood that in embodiments of the present technology for individualized initialization of computing devices, one or more of the steps can be performed manually.

The present invention provides for individualized per device initialization of computing devices. An individualized per device initialization program is unique relative to initialization programs in other computing devices. A common initialization program, common to all computing devices of a particular type such as a game console, may be modified to be unique for each computing device. Modification may be of the image of the secured or unsecured stored initialization program (e.g., stored in processor memory, disk, flash memory, of the like), or in programming data and/or instructions within the initialization program. Modification may comprise the application of one or more individualized per device secret such as a secret or public key to at least a portion of the common initialization program such as a particular initialization stage. As such, a common initialization program may be rendered unique to a particular computing device through, for example, encryption of the common initialization program by a key unique to the particular computing device. Per device secrets may also be used to authenticate signatures and verify contents of per device initialization program as a further measure to secure against unauthorized manipulation. Initialization is tied to one or more device specific identities. In this way, initialization vulnerabilities discovered on a particular device cannot be exploited en masse on other computing devices because each initialization program or its image in memory is unique to each device. Individualized per device initialization programs may only be accessed by one device by, for example, decrypting or otherwise unlocking the individualized per device initialization program with one or more per device secret that may be accompanied by other common or unique security measures. The device specific nature of the initialization program may be extended to other information on a computing device, such as all information input to the computing device in order to prevent unauthorized sharing of information with other computing devices.

Exemplary Open Computing Environment

FIG. 1 is a block diagram of an exemplary open computing environment in which various aspects of individualized initialization of computing devices can be implemented. For purposes of simplicity, not all components or interconnectivity are shown and some components have been merged into other components shown in FIG. 1. Although categorization may vary in degree from one system to the next, open computing environments are general purpose computing environments that may execute virtually any program while closed systems tend to be more specialized with one or more specific purpose(s) designed to execute, perhaps in addition to general programs, privileged programs specifically created for them. Examples of closed systems may include, for example, cable set top boxes, smart phones, gaming consoles and cellular telephones. Although not required, various aspects of individualized initialization of computing devices can be described in the general context of computer executable instructions, such as program modules, being executed by a personal computer, client workstation, server or other computing system. Generally, program modules include routines, programs, objects, components, data structures and the like that perform particular tasks or implement particular abstract data types. Moreover, implementation of individualized initialization of computing devices can be practiced with other computer system configurations, including hand held devices, multi processor systems, microprocessor based or programmable consumer electronics, network PCs, minicomputers, mainframe computers, and the like. Further, individualized initialization of computing devices also can be practiced in distributed computing environments where tasks are performed by remote processing devices that are linked through a communications network. In a distributed computing environment, program modules can be located in both local and remote memory storage devices.

A computer system can be roughly divided into three component groups: the hardware component, the hardware/software interface system component, and the application programs component (also referred to as the "user component" or "software component"). In various embodiments of a computer system the hardware component may comprise central processing unit (CPU) 120, memory (both ROM 111 and RAM 113), various input/output (I/O) devices such as keyboard 152, mouse 151, display 126, and/or printer (not shown), among other components. To some degree, initialization firmware such as basic input/output system (BIOS) 112 may be considered part of the hardware component as well as part of the hardware/software interface system component. The hardware component comprises the basic physical infrastructure for the computer system.

The application programs component comprises various software programs including but not limited to compilers, database systems, word processors, business programs, video games, and so forth. Application programs provide the means by which computer resources are utilized to solve problems, provide solutions, and process data for various users (machines, other computer systems, and/or end-users).

The hardware/software interface system component comprises (and, in some embodiments, may solely consist of) an operating system that itself comprises, in most cases, a shell and a kernel. As previously noted, firmware such as BIOS may also be considered part of the hardware/software interface system. An "operating system" (OS) is a special program that acts as an intermediary between application programs and computer hardware. The hardware/software interface system component may also comprise a virtual machine manager (VMM), a Common Language Runtime (CLR) or its functional equivalent, a Java Virtual Machine (JVM) or its functional equivalent, or other such software components in the place of or in addition to the operating system in a computer system. In addition to performing initialization tasks, depending on the system BIOS may also provide some level of interface between hardware and software that isn't performed by the operating system. A purpose of a hardware/software interface system is to provide an environment in which a user can execute application programs.

The hardware/software interface system is generally loaded into a computer system during initialization and thereafter manages all of the application programs in the computer system. The application programs interact with the hardware/software interface system by requesting services via an application program interface (API). Some application programs enable end-users to interact with the hardware/software interface system via a user interface such as a command language or a graphical user interface (GUI).

A hardware/software interface system traditionally performs a variety of services for applications. In a multitasking hardware/software interface system where multiple programs may be running at the same time, the hardware/software interface system determines which applications should run in what order and how much time should be allowed for each application before switching to another application for a turn. The hardware/software interface system also manages the sharing of internal memory among multiple applications, and handles input and output to and from attached hardware devices such as hard disks, printers, and dial-up ports. The hardware/software interface system also sends messages to each application (and, in certain case, to the end-user) regarding the status of operations and any errors that may have occurred. The hardware/software interface system can also offload the management of batch jobs (e.g., printing) so that the initiating application is freed from this work and can resume other processing and/or operations. On computers that can provide parallel processing, a hardware/software interface system also manages dividing a program so that it runs on more than one processor at a time.

A hardware/software interface system shell (referred to as a "shell") is an interactive end-user interface to a hardware/software interface system. (A shell may also be referred to as a "command interpreter" or, in an operating system, as an "operating system shell"). A shell is the outer layer of a hardware/software interface system that is directly accessible by application programs and/or end-users. In contrast to a shell, a kernel is a hardware/software interface system's innermost layer that interacts directly with the hardware components or their device drivers and/or the BIOS.

As shown in FIG. 1, an exemplary open computing environment in which various aspects of individualized initialization of computing devices can be implemented includes a conventional computing device 105 or the like, including processing unit 120, system memory 110, and system bus 165 that couples various system components including system memory 110 to processing unit 120. Processing unit 120 may comprise, for example, a CPU, Northbridge and Southbridge chipset with their well-known functionality, among other components. System bus 165 may be any one or all of several types of bus structures including a memory bus, peripheral bus and a local bus using any of a variety of bus architectures. System memory 110 includes read only memory (ROM) 111 and random access memory (RAM) 113. Basic input/output system (BIOS) 112, containing basic routines that help to transfer information between elements within the computing device 105, such as during initialization, is stored in ROM 111. Among other functionality such as a power on self test or POST as it is commonly known, BIOS 112 may include a computer initialization program such as a boot loader stage to load other initialization stages or load and turn over control to operating system 114. While the only BIOS shown is BIOS 112, some hardware devices such as optical drives may have their own BIOS or other necessary initialization firmware, which may be executed in addition to BIOS 112 during initialization of computing device 105. ROM 111 may include embedded memory, e.g., within the CPU of processing unit 120, and/or one or more discrete non volatile memory devices, including flash memory.

Computing device 105 may further include hard disk drive 136 for reading from and writing thereto operating system 114, application programs 115, other programs 116, program data 117 or other information, magnetic disk drive 141 (e.g. floppy disk drive) for reading from or writing to removable storage 142 or other magnetic disk operating system 114, application programs 115, other programs 116, program data 117 or other information, and optical disk drive 146 for reading from or writing to removable optical disk 147, such as a CD ROM or other optical media, operating system 114, application programs 115, other programs 116, program data 117 or other information. Hard disk drive 136, magnetic disk drive 141, and optical disk drive 146 are connected to system bus 165 by a hard disk drive interface 135, magnetic disk drive interface 140, and optical disk drive interface 145, respectively. The exemplary environment of FIG. 1 also includes universal serial bus (USB) controller 130, USB 131 and USB device 132 (e.g. removable USB flash memory or hard disk drive). USB device 132 is coupled to system bus 165 via universal serial bus 131 and USB controller 130. The drives and their associated computer readable media provide non volatile storage of computer executable instructions, data structures, program modules and other data for computing device 105. Similarly, USB device 132 may also comprise removable non-volatile memory such as a USB flash or hard drive, among a host of other devices. Although the exemplary environment described herein employs hard disk 136, removable magnetic disk 142, removable optical disk 147 and removable USB device 132, it is well-known that a computing system may employ many other types of fixed and removable, volatile and non-volatile computer readable media. Likewise, the exemplary environment may also include many types of monitoring devices such as heat sensors and security or fire alarm systems, and other sources of information.

Data and any number of program modules comprising computer-executable instructions, such as BIOS 112 or other initialization program, operating system 114, application programs 115, other program modules 116 and data such as program data 117, can be stored on any one or more computer-readable mediums such as hard disk drive 136, magnetic disk 142, optical disk 147, ROM 111 (e.g. ROM, EEPROM, flash memories, eFuses), USB device 132, RAM 113 or any other discrete or embedded, volatile or non-volatile memories (not shown). A user may enter commands and information into computing device 105 through input devices such as keyboard 152 and a pointing device such as mouse 151. A wide variety of other input devices (not shown) may include, for example, a microphone, joystick, game pad, tablet or scanner. These and other input devices are often connected to processing unit 120 through a serial port interface 150 that is coupled to system bus 165, but may be connected by other wired or wireless interfaces, such as a parallel port, game port, universal serial bus (USB) or Firewire. Display 126 or other type of display device is also connected to system bus 165 via an interface such as graphics controller 125. In addition to display 126, computing devices typically include other peripheral output devices, such as speakers and printers (not shown).

Computing device 105 may operate in a local and/or wide area network environment using logical connections to one or more remote computers, such as remote computer(s) 160. Remote computer(s) 160 may be another computing device (e.g., personal computer), a server, a router, a network PC, a peer device, or other common network node, and typically includes many or all of the hardware, firmware and software elements described above relative to computing device 105. The logical connections depicted in FIG. 1 include a local area network (LAN) 161 and wide area network (WAN) 162. Such networking environments are commonplace in offices, enterprise wide computer networks, intranets and the Internet. When used in a LAN networking environment, computing device 105 is connected to LAN 161 through network interface 155. When used in a WAN networking environment, computing device 105 can include modem 153 or other means for establishing communications over WAN 162, such as the Internet. While modem 153, which may be internal or external to computer 105, is shown connected to system bus 165 via serial port interface 150, it may be connected in a variety of other ways. In a networked environment, program modules, or portions thereof, may be stored in a remote memory storage device. It will be appreciated that the network connections shown are exemplary and other means of establishing a communications link between computer 105 and remote computer(s) 160 may be employed.

While it is envisioned that numerous embodiments of individualized initialization of computing devices are particularly well-suited for computerized systems, nothing in this document is intended to limit individualized initialization of computing devices to such embodiments. On the contrary, as used herein the term "computer system" is intended to encompass any and all devices capable of storing and processing information and/or capable of using the stored information to control the behavior or execution of the device itself, regardless of whether such devices are electronic, mechanical, logical, or virtual in nature.

Individualized initialization of computing devices such as computer device 105 can be implemented in connection with hardware, firmware or software or a combination thereof. Thus, the methods, apparatuses and systems for individualized initialization of computing devices, or certain aspects or portions thereof, can take the form of program code (i.e., instructions) and/or data embodied in tangible computer readable media, such discrete or embedded memories such as hard disk drives, magnetic disks, optical disks, USB devices, ROM memories, flash memories, eFuses or any other machine-readable storage medium, wherein, when the program code or data is loaded into and executed or read by a machine, such as computer device 105, the machine becomes an apparatus for implementing individualized initialization of computing devices. The program(s) can be implemented in assembly or machine language, if desired. In any case, the language can be a compiled or interpreted language, and combined with hardware implementations. The methods and apparatuses for implementing individualized initialization of computing devices also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like. When executed by a processor, the program code combines with the processor to provide a unique apparatus that operates to invoke the functionality of individualized initialization of computing devices. Additionally, any storage techniques used in connection with individualized initialization of computing devices can invariably be a combination of hardware, firmware and software.

Exemplary Closed Computing Environment

Figure 2:
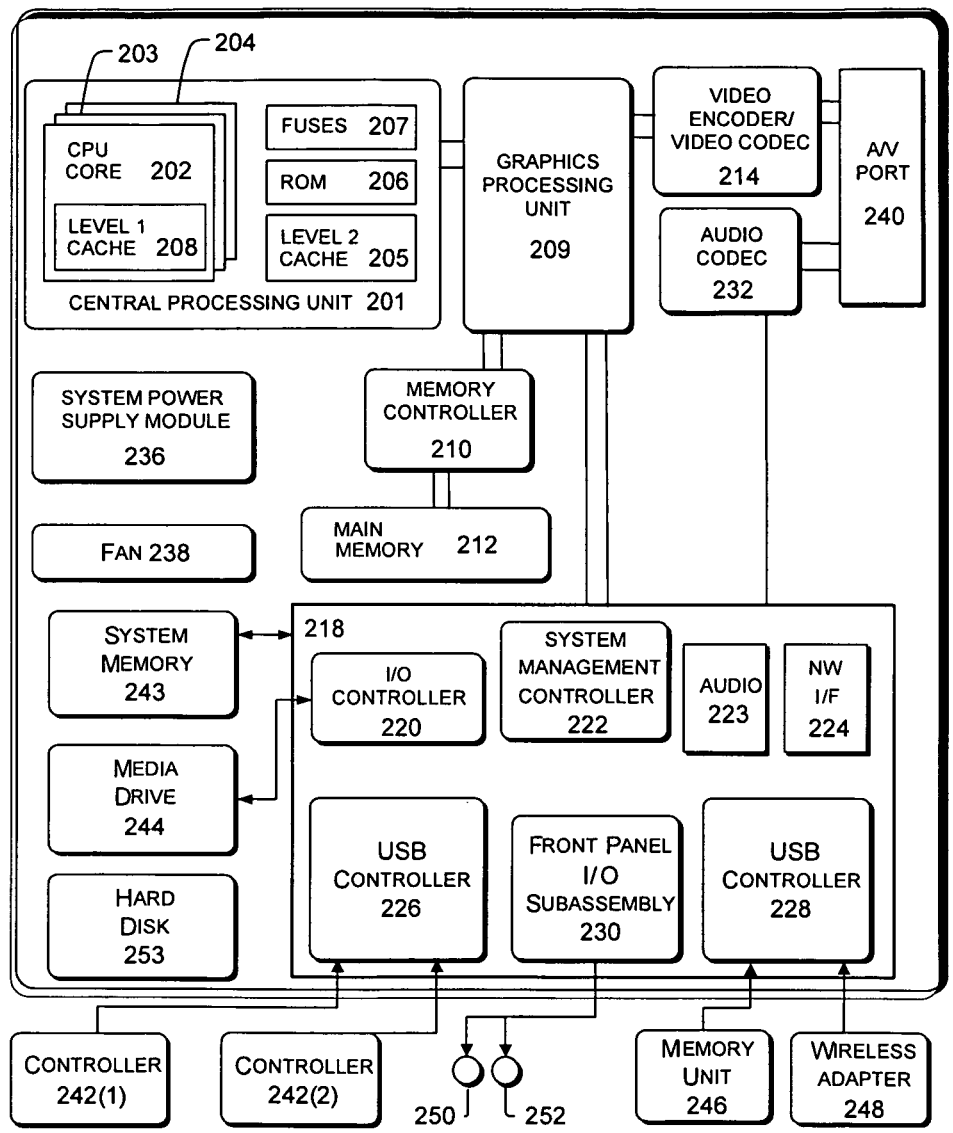
FIG. 2 is a block diagram of an exemplary closed computing environment in which various aspects of individualized initialization of computing devices can be implemented.

Without limitation, FIG. 2 is a block diagram of an exemplary closed computing environment in which various aspects of individualized initialization of computing devices can be implemented. Closed computing devices tend to be more specialized, or have at least one specialized purpose, relative to general purpose computing devices. Closed systems tend to have one or more specific purpose(s) designed to execute, perhaps in addition to general programs, privileged programs and/or services specifically created for them. Examples of closed systems may include, for example, cable set top boxes, smart phones, gaming consoles such as Microsoft's Xbox 360 and cellular telephones that execute one or more privileged programs. As an example of what makes the Xbox 360 a closed computing environment, at least in part, is that it is designed to gain restricted access to services such as Xbox LIVE and Xbox LIVE Marketplace located at http://www.xbox.com. Xbox, Xbox 360 and Xbox Live are registered trademarks of Microsoft Corporation, One Microsoft Way, Redmond, Wash. 98052-6399. Xbox LIVE is a full spectrum online gaming and entertainment service. Besides providing online multiplayer gaming, through Xbox Live and Xbox LIVE Marketplace, customers can download purchased and promotional content to their Xbox 360, including high definition and standard definition television shows, movies, gaming videos, music videos, short feature films, video games, dashboard themes, slideshows, gamer pictures, game trailers/demos, movies, game content such as new maps, weapons, levels, characters, challenges, expansions, arcade games, demos and trailers. Without adequate initialization and other security measures, Xbox 360 gaming consoles may be manipulated for unauthorized use or access.

FIG. 2 is a block diagram of an Xbox 360 gaming console. Game console 200 comprises hardware, firmware and software. Game console 200 executes game applications and plays generic and specialized media files (not shown). For purposes of simplicity, not all components or interconnectivity are shown and some components have been merged in exemplary game console 200. Game console 200 comprises central processing unit (CPU) 201, which has multiple CPU cores 202, 203, 204, each having embedded cache such as level 1 (L1) cache 208. CPU 201 further comprises level 2 (L2) cache 205, ROM (Read-Only Memory) 206 and fuses 207. CPU cores 202, 203 and 204 may share L2 cache memory 205. Level 1 and Level 2 cache 208, 205 temporarily store executable instructions and/or data, thereby improving processing speed and throughput. ROM 206 may store firmware such as BIOS or other initialization programs and data loaded during an initial phase or stage of a boot process such as when game console 200 is initially powered on. Alternatively, or in addition, the BIOS or other initialization programs and data loaded during one or more initialization phases/stages can be stored in another type of non-volatile memory such as flash (a type of EEPROM) memory, as may be represented by system memory 243, or fuses 207. In some embodiments, fuses 207 may be electronically programmable. In some embodiments, ROM 206, fuses 207, and alternative non-volatile memory storing initialization programs and/or data need not be embedded within CPU 201. However, physically locating memory devices that store initialization programs or data in CPU 201 may offer an added layer of security for such information. Game console 200 may optionally be a multi-processor system. For example, game console 200 may have three processors that are similar or dissimilar to processor 201.

Game console 200 further comprises graphics processing unit (GPU) 209, which is coupled to CPU 201, and any additional processors, by a bus. GPU 208 is also coupled by one or more busses each to memory controller 210, I/O (input/output) hub 218 and video codec (coder/decoder) 214. Memory controller 210 and video codec 214 may form part of GPU 209. GPU 209, in addition to video processing functionality, may comprise functionality commonly referred to as Northbridge. Northbridge functionality generally comprises a high speed memory and video hub having a memory controller and a video controller. In exemplary game console 200, both CPU 201 and I/O hub (Southbridge) 218 access main memory 212 through Northbridge functionality in GPU 209. Memory controller 210 facilitates access to various types of main memory 212, which may be RAM (Random Access Memory) or other variety of memory.

GPU 209 and video codec 214 together form a video processing pipeline for high speed, high resolution graphics processing required by many game applications. Data is carried from GPU 209 to/from video codec 214 via a bi-directional bus. This video processing pipeline outputs data to A/V (audio/video) port 240 for transmission to a television or other video display device (not shown). Game console 200 may have its own integrated display (not shown). Not shown is a digital to analog converter (DAC) that may be coupled between video codec 214 and A/V port 240.

Game console 200 further comprises I/O hub 218, which may comprise, among other functionality, functionality commonly referred to as Southbridge. Southbridge functionality generally performs and controls functions that are relatively slow compared to functions performed and controlled by Northbridge. I/O hub 218 comprises I/O controller 220, system management controller 222, audio processing unit 223, network interface controller 224, USB host controllers 226, 228 and front panel I/O subassembly 230. USB controllers 226, 228 serve as hosts for peripheral controllers 242(1), 242(2), wireless adapter 248, and memory unit 246 (e.g., flash memory, CD/DVD ROM, hard drive, other removable media). Network interface 224 and/or wireless adapter 248 provide access to a network (e.g., LAN, WAN or Internet) and may be any of a wide variety of various wired or wireless interface components including an Ethernet card, modem, Bluetooth module, and the like.

System memory 243 may be volatile and/or non-volatile memory, including flash memory. In some embodiments system memory 243 may store all or a portion of the initialization program and data (e.g. various boot loader stages) and operating system that is loaded during the initialization boot process. In other embodiments, system memory 243 may store application data, game saves and downloads. Media drive 244 may comprise, for example, a DVD/CD drive, hard drive or other fixed or removable media reader and/or writer. Game application data may be read from and/or written to media via media drive 244 for execution, playback, etc. by game console 200. Media drive 244 is connected to I/O controller 220 via a bus, such as a Serial ATA bus or other high speed connection. Game console 200 may include hard disk 252, which may be used, for example, to store all or a portion of the initialization program and data (e.g. various boot loader stages) and operating system that is loaded during the initialization boot process, game applications, game data or other types of data.

System management controller 222 provides a variety of service functions for game console 200. Audio processing unit 223 and audio codec 232 form a corresponding audio processing pipeline that may provide high fidelity, 5D, surround, and stereo audio processing of sounds produced by, for example, a game application. Audio data is carried between audio processing unit 223 and audio codec 232 via a communication link. The audio processing pipeline outputs audio data to A/V port 240 for implementation by a device having audio capabilities.

Front panel I/O subassembly 230 supports the functionality of various controls such as power button 250 and eject button 252, as well as any LEDs (light emitting diodes) or other indicators exposed on the outer surface of game console 200. System power supply module 236 provides power to components of game console 200 while fan 238 cools them.

CPU 201, GPU 209, memory controller 210, and various other components within game console 200 are interconnected via one or more buses, including serial and parallel buses, a memory bus, a peripheral bus, and a processor or local bus using any of a variety of bus architectures. As previously noted, not all buses or other connections and components are shown in FIG. 2.

When game console 200 is powered on or rebooted, aside from initialization, application data and/or instructions can be loaded from system memory 243, media drive 244, hard disc 253 or other memory into main memory 212 and/or caches 205, 208 and executed on CPU 201. The game application being executed may present a graphical user interface that provides a consistent user experience when navigating to different media types available on or to game console 200. Instructions and/or data accessible via media drive 244, system memory 243, hard disk 253 or other memory may be launched, played or otherwise accessed from these various sources to provide additional functionality to game console 200.

Game console 200 may be operated as a stand alone system by connecting the system to a television or other display. As previously noted, game console 200 may have an integrated display. In this stand alone mode, game console 200 may allow one or more users to interact with the system, watch movies, listen to music, play games and the like. Network interface 224 or wireless adapter 248 may allow game console 200 to be operated as a participant in a local or wide area network community such as Xbox LIVE.

Figure 3:
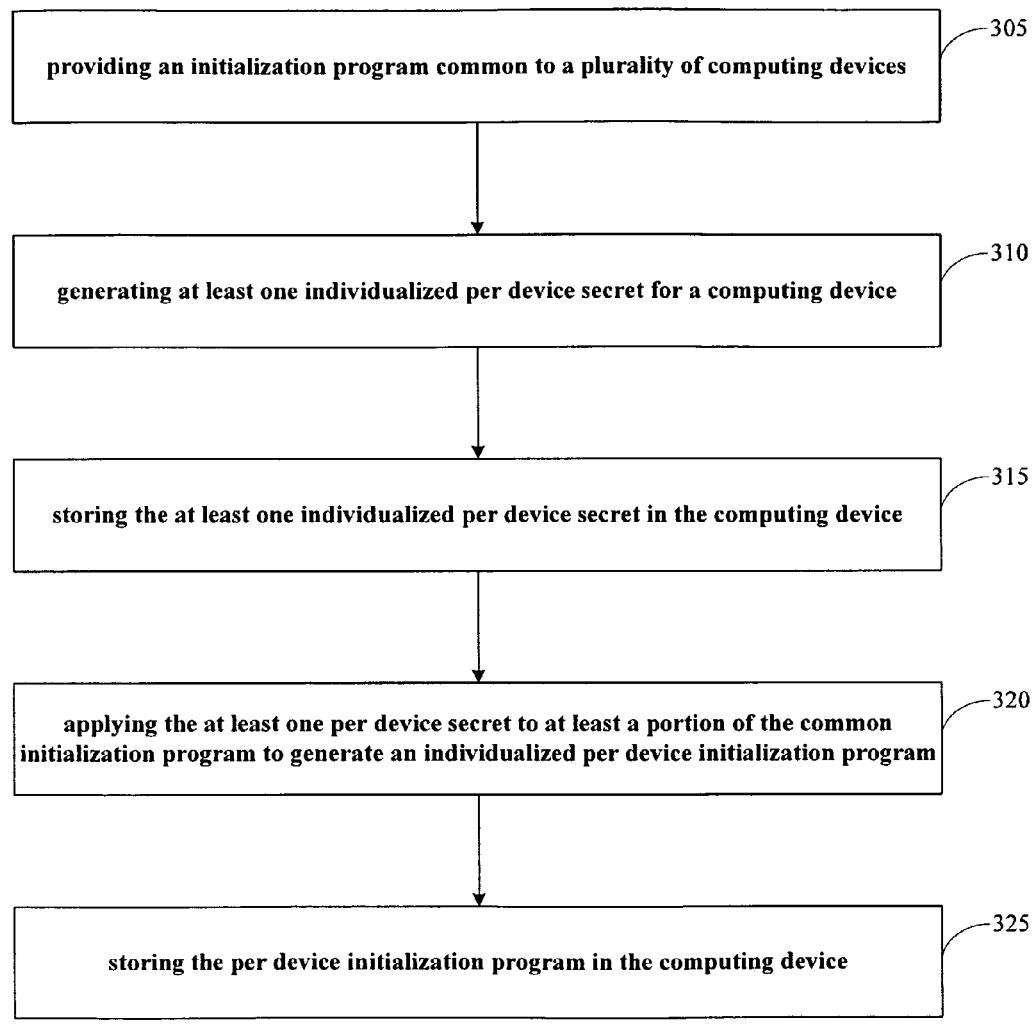
FIG. 3 is a flow diagram illustrating various aspects of individualized initialization of computing devices in accordance with one embodiment thereof.
Figure 4:
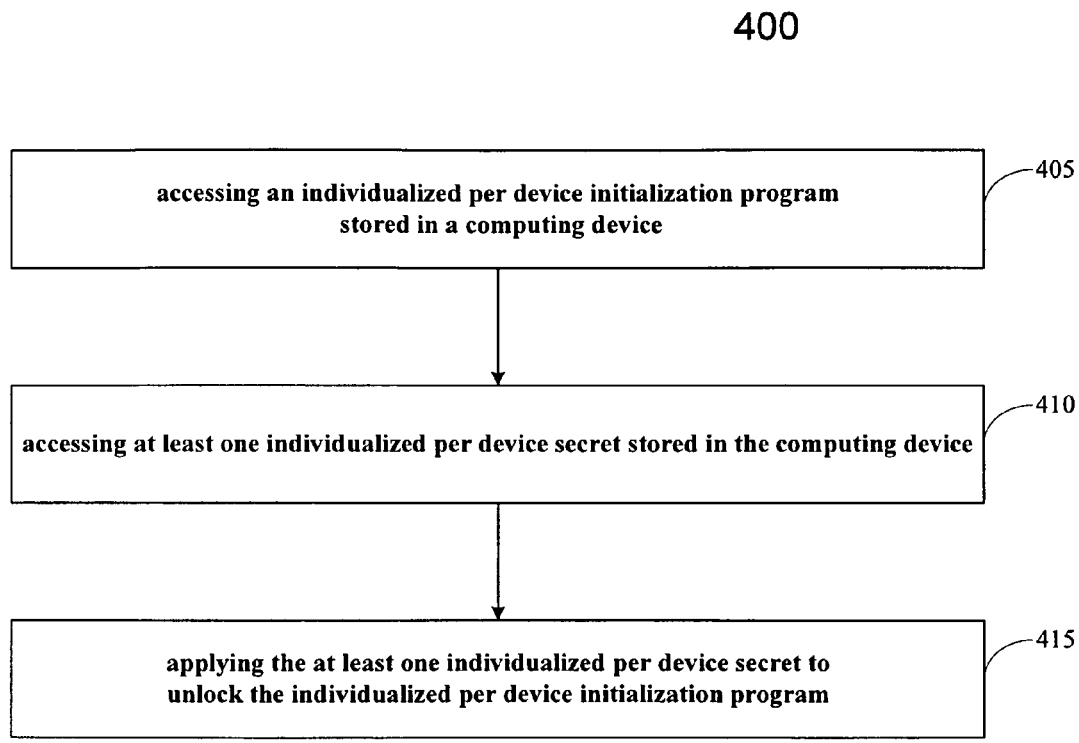
FIG. 4 is a flow diagram illustrating various aspects of individualized initialization of computing devices in accordance with one embodiment thereof.

Exemplary embodiments of individualized initialization of a computing device will be now be discussed with respect to FIGS. 3 and 4. Although the embodiments refer to the exemplary game console 200, the embodiments have applicability to exemplary computing system 100 and other computing environments as well.

FIG. 3 is a flow diagram illustrating various aspects of individualized initialization of computing devices in accordance with one embodiment thereof. Exemplary method 300 for creating a computing device having, among a plurality of computing devices, an individualized initialization program stored in non-volatile memory therein comprises, for example, step 305 providing an initialization program common to the plurality of computing devices, step 310 generating at least one individualized per device secret for the computing device, step 315 storing the at least one individualized per device secret in the computing device, step 320 applying the at least one per device secret to at least a portion of the common initialization program to generate a individualized per device initialization program, and step 325, storing the per device initialization program in the computing device.

Step 305 providing an initialization program common to the plurality of computing devices comprises, for example, a standard initialization program for Xbox 360 game console devices given that they are computing devices that may be designed to employ a common initialization program. An exemplary common initialization program may comprise a whole or a segmented, partitioned or staged initialization program. For purposes of discussion, it will be assumed that the common initialization program is a multi-stage initialization program with reference to game console 200 in FIG. 2. Upon initialization, CPU 201 may be designed to execute its first instructions in ROM 206, which is where the first stage of initialization, e.g., a first boot loader stage referred to as 1BL, may be stored. Since ROM 206 is generally limited in size, first stage 1BL is designed to, among other things, access a second, larger boot loader stage (2BL) in larger flash memory, e.g., system memory 243. Generally, a primary function of various stages of initialization, e.g., 1BL on ROM 206 and 2BL, 4BL, 5BL, 6BL, and 7BL on system memory 243, is to load an operating system for the computing device and any patches to it before turning control of game console 200 over to the patched operating system.

The presence and number of stages in the common initialization program may vary from one embodiment to the next, perhaps in accordance with design (e.g. the presence of ROM and fuses in the CPU and larger flash memory external to the CPU) and/or security measures. The common initialization program may be protected or unprotected. For example, one or more common security measures such as global or constant secret may be embedded in one or more stages of an initialization program common to the plurality of computing devices. As another example of common security measures, each stage may be protected by one or more previous stages in the initialization program. In some embodiments, each stage may be independently encrypted to conceal it, independently signed to validate authenticity or integrity of each stage, or otherwise commonly protected against tampering. Multiple common cryptographic techniques may be employed together to protect the same information. Each key may be a symmetric single secret key as in the case of DES, AES, or the like, or an asymmetric public key as in the case of RSA. Encryption may be single or multiple (e.g. triple DES). For example, a public key pair may be used to encrypt a secret key used to encrypt a stage. Thus, each stage of an initialization program may be independently encrypted with the key(s) embedded in a preceding stage or elsewhere, as in a key vault, for example.

Further security measure may include, for example, a keyed-hash message authentication code (HMAC) such as HMAC-SHA-1, to verify both the authenticity of the signor and the integrity of the information in each stage. While the message and the signature accompanying it are located in the stage to be authenticated/validated, the key, e.g. public key, to analyze the message and signature may be stored in a preceding stage or elsewhere, e.g., ROM 206, fuses 207. An initialization program may be "rolled up" in storage protected by multiple security measures and, upon initialization, "unrolled" by successfully traversing the various security measures. Various stages in a common initialization program may also utilize other common security measures such as using memory, e.g., RAM, ROM 206, fuses 207, in the CPU 201 or segregating RAM, e.g. main memory 212, for sensitive information or operations. Various stages may also be encoded, compressed or otherwise manipulated. The point being that per device individualization of an initialization program may be the only security measure or it may be a supplemental security measure. An individualized initialization program may also be used with digital rights management systems such as Trusted Computing technology promulgated by the Trusted Computing Group as implemented in numerous ways by numerous manufacturers of computing devices. Game console 200 may, for example, comprise a Trust Computing Module (TPM) (not shown in FIG. 2).

Step 310 generating at least one individualized per device secret for the computing device comprises, for example, seeding a pseudo-random number generator (PRNG) with a truly, i.e. non-deterministic, random number to generate a random per device secret, e.g., key, for use in individualizing one or more stages of a common initialization program among other potential uses. A number bearing relation to the CPU such as a CPUID may be used if it is truly random or if it is combined with a truly random seed. In this way, it may be assured with great probability that an individualized per device secret is generated for each computing device. In some embodiments, the individualized per device secret may comprise a private key of a public/private pair. Again, this per device secret, e.g., key, may accompany many other secret and public keys in various layers of security. Further, multiple per device secrets may be generated for each device. For example, none to all of the preceding security measures discussed with respect to the common initialization program may be substituted or supplemented with individualized per device secrets. For example, each stage of the initialization program may be encrypted and/or signed with an individualized per device private key retained by the manufacturer. In such embodiments, the individualized per device public key may be stored in non-volatile memory such as in a stage preceding the stage requiring the key to decrypt the stage, authenticate its signature and/or validate its contents.

Step 315 storing the at least one individualized per device secret in the computing device comprises, for example, storing the at least one individualized per device secret in non-volatile memory in game console 200. Non-volatile memory includes, ROM 206, fuses 207, system memory 243 (e.g.

flash), hard disk 253, etc. One or more of the per device secrets may be embedded in the initialization program or stored independently unsecured or secured, for example by encryption or signature. For example, in some embodiments a per device secret key may be stored in fuses 207, a global or constant key may be stored in ROM 206 and a random key may be stored in each stage for use in decrypting, authenticating and verifying a subsequent stage.

Step 320 applying the at least one per device secret to at least a portion of the common initialization program to generate a per device individualized initialization program comprises, for example, encrypting at least a portion (e.g. at least one stage) of the common initialization program, which may include instructions and/or data, so that the common initialization program becomes individualized. Alternatively, or additionally, one or more per device secrets may be applied to encrypt all stages of the common initialization program. In some embodiments, one per device key may be used, perhaps in conjunction with other per device, constant or random keys to encrypt and/or sign each stage of the common initialization program. The per device secret key may be applied alone or in combination with other keys (per device secrets, random public keys, constant keys, etc.) to encrypt and/or sign one to more stages of common initialization program. In this way, the initialization of a computing device is tied back to one or more unique device identifiers (i.e. per device secrets). Of course the one or more per device secrets may be used for other purposes in addition to initialization. For example, the one or more per device secrets may be used to encrypt and/or sign all media files, programs or other input information, including games input to the computing device, e.g., by downloading, so that the input information may only be accessed (e.g. played or executed) by the computing device. In this way, unauthorized sharing may be prevented.

Step 325, storing the per device initialization program in the non-volatile memory of the computing device comprises, for example, storing the per device initialization program (including programs and data) in whole or in part (e.g. stages) in non-volatile memory such as ROM 206, fuses 207, system memory 243 (e.g. flash), hard disk 253, etc. The physical security offered by storage in ROM 206 and fuses 207 is superior to storage in system memory 243 and hard disk 253. In some embodiments a per device secret may be stored in fuses 207 while a first boot loader stage (e.g. 1BL) of the per device initialization program may be stored in ROM 206, which may contain one or more per device secret, public, random or other keys, and remaining stages may be stored in system memory 243 (e.g. flash memory). The difficulty of engaging in unauthorized manipulation of ROM 206 and fuses 207 greater protects the most physically vulnerable portion of the per device initialization program in flash memory 243. An image of the flash memory from one computing device may not be written to another computing device because it will not initialize unless the image is in accordance with all security measures including those in ROM 206 and fuses 207.

An advantage of having a per device initialization program stored in a computing device is that a vulnerability in one device cannot be exploited en masse on other computing devices by reusing the same modified initialization program. If a hacker finds a software vulnerability in an initialization stage on one computing device and moves to exploit it or distribute it with a mod chip or otherwise as the hack exploitation is limited to one computing device. Since a hacker doesn't know all the per device secrets of all devices he cannot prepare a modified initialization stage or program that would run on all devices.

Another advantage of having a per device initialization program stored in a computing device is that it makes reverse engineering by comparison more difficult because among two computing devices there are at least two per device secrets, likely among many other security measures.

FIG. 4 is a flow diagram illustrating various aspects of individualized initialization of computing devices in accordance with one embodiment thereof. Exemplary method 400 for initializing a computing device comprises, for example, step 405 accessing an individualized per device initialization program stored in the computing device, step 410 accessing at least one individualized per device secret stored in the computing device, and step 415 applying the at least one individualized per device secret to unlock the individualized per device initialization program.

Step 405 accessing an individualized per device initialization program stored in the computing device comprises, for example, accessing (with reference to embodiments discussed in FIGS. 2 and 3) the first boot loader stage 1BL in ROM 206, second boot loader stage 2BL or any other stage, e.g., 4BL, 5BL, 6BL, 7BL, in flash memory 243. In some embodiments, CPU 201 may be designed to obtain its first instruction at a predefined location in ROM 206. In some embodiments, ROM may begin with a power on self test or POST as it is commonly known. In some embodiments the first boot loader stage 1BL stored in ROM 206 may be similar among computing devices while in others it may not be. However, at least a portion of the individualized per device initialization program, e.g., at least one stage, must be individualized for each computing device. Common stages such as 1BL in some embodiments would lead to access to an individualized portion of the initialization program. In other embodiments, the first stage may be individualized while subsequent stages may be common or individualized per computing device.

Step 410 accessing at least one individualized per device secret stored in the computing device comprises, for example, accessing (with reference to embodiments discussed in FIGS. 2 and 3) a per device secret, e.g. key of any variety, stored in fuses 207. Of course in other embodiments there may be more than one per device secret and each secret may be stored in any non-volatile fixed or programmable memory. For example, in some embodiments a first stage such as 1BL stored in ROM 206 may comprise instructions that access one or more per device secrets stored in ROM 206, fuses 207, system memory 243 or other non-volatile memory for use in unlocking subsequent stages to continue in the process of initialization of a computing device.

Step 415 applying the at least one individualized per device secret to unlock the individualized per device initialization program comprises, for example, applying (with reference to embodiments discussed in FIGS. 2 and 3) the per device key stored in fuses 207, perhaps along with other keys to decrypt, authenticate and/or verify the contents of at least one of the stages of the per device initialization program, e.g., 1BL, 2BL, 4BL, 5BL, 6BL, and 7BL. The per device secret may be applied alone or in combination with other security measures. For example, a per device key stored in fuses 207, a global or constant public key stored in the 1BL stage in ROM 206 and per stage keys, e.g. per stage keys in each of 1BL, 2BL, 4BL, 5BL and 6BL for use in subsequent stages, may be used in series or combined to decrypt, authenticate and/or verify the contents of various stages of the individualized per device initialization program, the stages of which may comprise instructions and/or data. For example, stage 5BL may comprise an operating system that stage 4BL loads, decrypts, decompresses, authenticates and validates while stage 6BL may comprise patches to the operating system that stage 7BL loads, decrypts, decompresses, authenticates and validates. The existence of stages and their purpose may vary widely among embodiments. Each per device secret may be used repeatedly, as in the case of application to multiple stages of the per device initialization program to "unroll" it. So long as each step of the initialization successfully decrypts, authenticates and/or verifies each stage the initialization will continue. Otherwise, it may stop, perhaps issuing a message to the user or permitting the user to restore the per device initialization program required by the computing device.

An advantage of having a per device initialization program per computing device is that a vulnerability in one device cannot be exploited en masse on other computing devices by reusing the same modified initialization program. If a hacker finds a software vulnerability in an initialization stage on one computing device and moves to exploit it or distribute it with a mod chip or otherwise, it will not be effective because the hack exploitation is limited to one computing device. While an initialization may vary from one embodiment to the next in terms of individualization by encryption, multiple encryption, use of asymmetric public keys or symmetric secret key algorithms, encoding(s), signatures, etc., it remains true that the unique initialization image per device cannot be re-used on other devices. Since a hacker doesn't know all the per device secrets of all devices he cannot prepare a modified initialization stage or program that would run on all devices.

Another advantage of having a per device initialization program per computing device is that it makes reverse engineering by comparison more difficult because among two computing devices there are at least two per device secrets, likely among many other security measures.

Individualized initialization of computing devices has broad applicability to any system that could benefit from protecting information or services against misuse. Individualized initialization of computing devices not only makes it more difficult to attack systems employing it, but also prevents mass exploitation of successful attacks, which eliminates much of the incentive to attack computing devices in the first place. This damage control security measure could save manufacturers and service providers from costly recalls and lost business due to application, service or media piracy.

While individualized initialization of computing devices has been described in connection with the example embodiments of the various figures, it is to be understood that other similar embodiments can be used or modifications and additions can be made to the described embodiments for performing the same functions of individualized initialization of computing devices without deviating there from. Therefore, individualized initialization of computing devices as described herein should not be limited to any single embodiment, but rather should be construed in breadth and scope in accordance with the appended claims.

What is claimed:

1. A method comprising:
providing a multi-stage standard boot program configured for storage and execution in each of a plurality of computing devices;
modifying in a specific computing device, the multi-stage standard boot program to permit execution in the specific computing device and eliminate re-use in computing devices other than the specific device, the modifying comprising:
generating in the specific computing device, at least two secrets;
exclusively storing the at least two secrets in the specific computing device, the exclusive storing directed at preventing access of the at least two secrets from outside the specific computing device;
unlocking a first stage of the multi-stage standard boot program using a first secret of the at least two secrets;
unlocking a second stage of the multi-stage standard boot program using a second secret of the at least two secrets, wherein unlocking of the second stage using the second secret is subject to successful unlocking of the first stage using the first secret;
generating, from the unlocked multi-staged standard boot program, an individualized boot program that is a modified version of the multi-stage standard boot program, the modified version unique to the specific computing device and unexecutable in other computing devices not having the at least one secret; and
storing the modified version in the specific computing device.

2. The method in accordance with claim 1, further comprising applying the first secret to a different stage of the multi-stage standard boot program.

3. The method in accordance with claim 1, wherein storing the at least two secrets in the specific computing device comprises storing the first secret and the second secret in a read only memory to prevent physical transfer of the first secret and the second secret out of the specific computing device.

4. The method in accordance with claim 3, wherein subsequent boot operations executed in the specific computing device comprises:
permitting unlocking of a second stage of the multi-stage standard boot program using a second key, only upon successful unlocking of the first stage using a first key.

5. The method in accordance with claim 1, wherein storing the at least two secrets in the specific computing device comprises storing the first secret and the second secret in fuses to prevent physical transfer of the first secret and the second secret out of the specific computing device.

6. A method comprising:
retrieving a first secret of at least two secrets stored exclusively in a specific computing device, the exclusive storing directed at preventing access of the at least two secrets from outside the specific computing device;
accessing a modified boot program stored in the specific computing device, the modified boot program generated by applying in the specific computing device, the first secret to a first stage of a multi-stage standard boot program, the modified boot program unique to the specific computing device and non-reusable in other computing devices not having the first secret;
unlocking the first stage of the multi-stage standard boot program using the first secret;
retrieving a second secret; and
unlocking a second stage of the multi-stage standard boot program using the second secret, wherein unlocking of the second stage using the second secret is subject to successful unlocking of the first stage using the first secret.

7. The method in accordance with claim 6, further comprising:
applying a per stage key to unlock subsequent stages of the multi-stage standard boot program.

8. The method in accordance with claim 6, wherein to unlock comprises to decrypt.

9. The method in accordance with claim 8, wherein to unlock further comprises to authenticate a digital signature.

10. A first computing device comprising:

a central processing unit (CPU) configured to exclusively store at least two secrets in the first computing device, the exclusive storing directed at preventing access of the at least two secrets from outside the first computing device;

retrieve a first secret of the at least two secrets;

generate an individualized per device modified boot program in the first computing device using at least the first secret stored in the first computing device;

use the first secret to unlock a first stage of the per device modified boot program;

retrieve a second secret of the at least two secrets; and use the second secret to unlock a second stage of the per device modified boot program, wherein unlocking of the second stage using the second secret is subject to successful unlocking of the first stage using the first secret.

11. The first computing device in accordance with claim 10, wherein the first computing device, during its operation following initialization, is configured to encrypt at least some information input to the first computing device using at least a third secret to restrict use of the information to the first computing device.

12. A machine readable storage memory having executable instructions that when executed perform operations comprising:

storing at least two secrets in a first computing device, the exclusive storing directed at preventing access of the at least two secrets from outside the first computing device;

applying a first secret of the at least two secrets to a standard initialization program that is configured for storage and execution in each of a plurality of computing devices, the first secret uniquely associated with the first computing device among the plurality of computing devices;

generating therefrom, a first individualized initialization program that is a first modified version of the standard initialization program, the first modified version uniquely executable on the first computing device by re-applying the first secret to unlock the first modified version;

applying a second secret of the at least two secrets to the standard initialization program, the second secret uniquely associated with the first computing device among the plurality of computing devices; and generating therefrom, a second individualized initialization program that is a second modified version of the standard initialization program, the second modified version uniquely executable on the first computing device by re-applying the second secret to unlock the second modified version, the second modified version unlockable only upon successful unlocking of the first modified version.

* * * * *